United States Patent [19]

Pearce et al.

[11] 4,116,079
[45] Sep. 26, 1978

[54] CHAIN DRIVE SHIFT SYSTEM

[76] Inventors: James D. Pearce, 1800 Banbury Rd., Raleigh, N.C. 27608; Stanley E. Pearce, 5004 Lakemont Dr., Raleigh, N.C. 27609; D. Kevin Pearce, 3025 Lewis Farm Rd., Raleigh, N.C. 27607

[21] Appl. No.: 731,852

[22] Filed: Oct. 12, 1976

[51] Int. Cl.² ............................................. F16H 9/00
[52] U.S. Cl. .................................................. 74/217 B
[58] Field of Search ....................................... 74/217 B

[56] References Cited

FOREIGN PATENT DOCUMENTS

| | | | |
|---|---|---|---|
| 786,784 | 6/1935 | France | 74/217 B |
| 650,921 | 10/1937 | Fed. Rep. of Germany | 74/217 B |
| 452,563 | 10/1949 | Italy | 74/217 B |

*Primary Examiner*—Benjamin W. Wyche
*Assistant Examiner*—Wesley S. Ratliff, Jr.
*Attorney, Agent, or Firm*—Mills & Coats

[57] ABSTRACT

In abstract, a preferred embodiment of this invention is a shift system for bicycle type chain drives, including noncable linkages for positive movement in both directions. The hand manipulated controls are conveniently located on the upper portion of the velocipede and are designed for simplicity and smooth operation.

5 Claims, 7 Drawing Figures

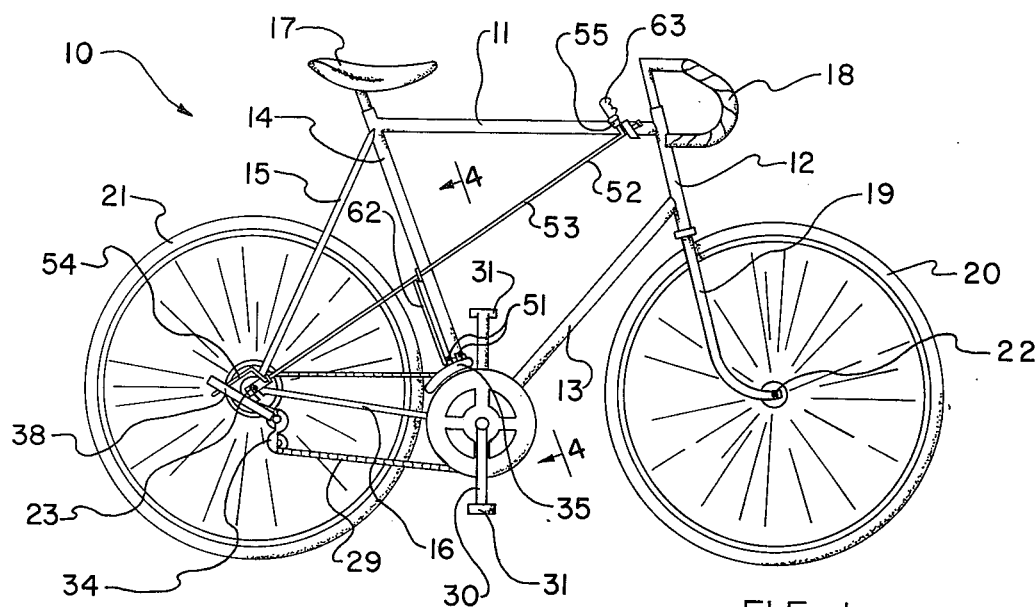
FIG. 1
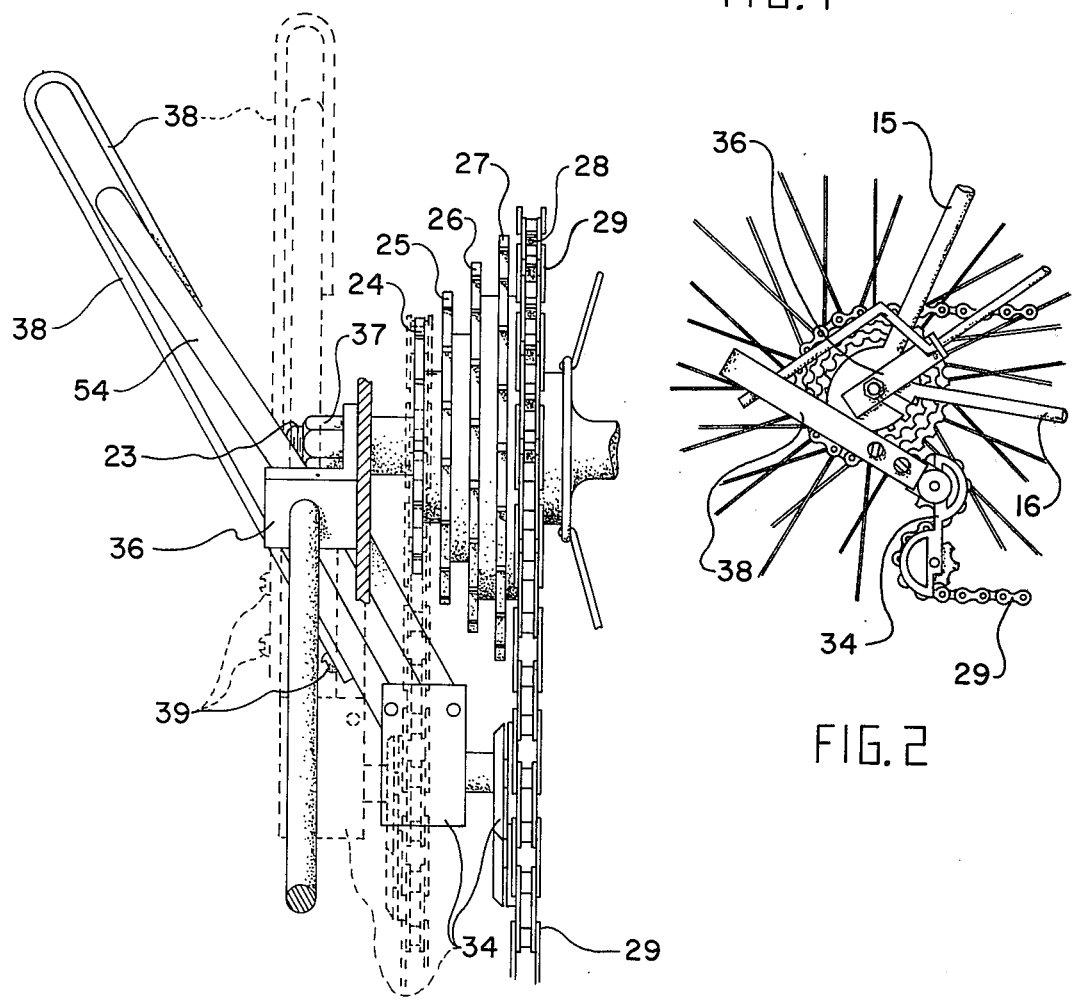
FIG. 3
FIG. 2

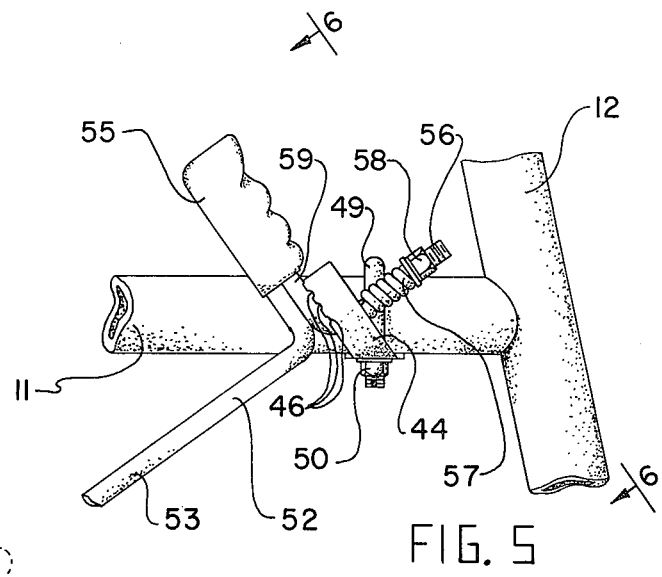
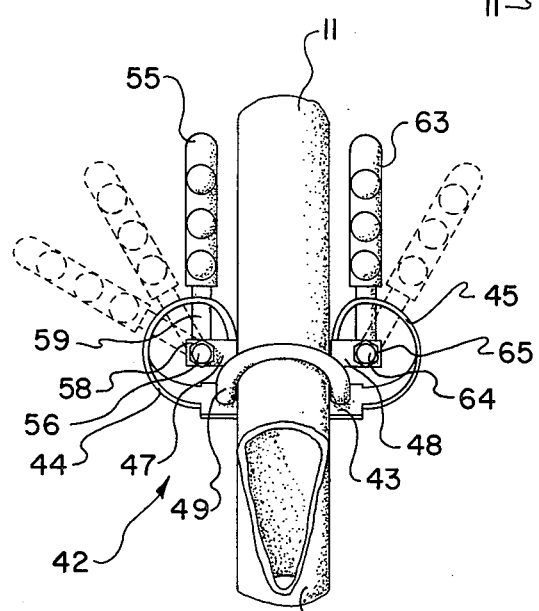
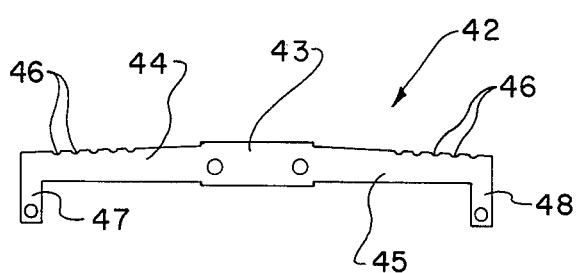
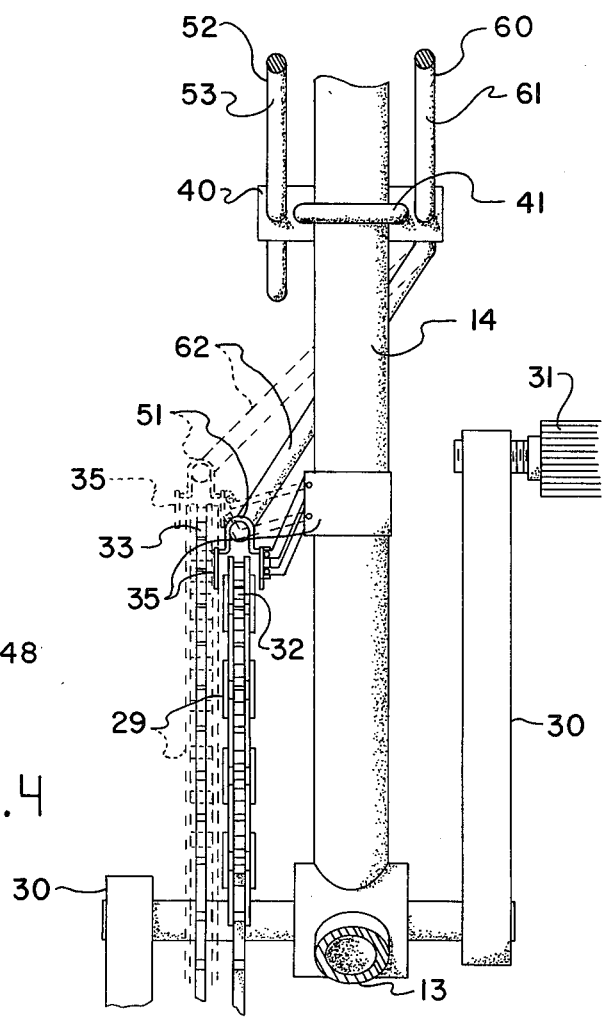

CHAIN DRIVE SHIFT SYSTEM

This invention relates to drive systems and more particularly to chain drive type ratio shift systems adapted for use in conjunction with bicycle type velocipedes.

Bicycle type chain drive mechanisms have been developed to the point that they are one of the most efficient mechanical drive mechanisms known. The reason for this is the high sophistication of the various sprockets on which the chains are adapted to be shiftingly trained. One of the drawbacks and almost universal problems and aggravations associated with all major production multi-ratio bicycle type chain drives is the fact that cables are used to shift in one direction to change ratio with spring biasing for shifting in the opposite direction. These cables invariably stretch under use and very quickly cause the shifting mechanism to get out of adjustment. The person using the bicycle either has to become a rather proficient bicycle mechanic or spend an excessive amount of money in keeping his velocipede in proper operating adjustment.

Double acting cables have been developed in attempts to eliminate spring biasing as have electrical gear changing devices. These devices have either been too expensive, too complex or both to be practical or have been of questionable operable design. Additionally some limited attempts have been made at mechanical linkage shifting but again these have created more problems than they solved. No system up until the present has been developed which incorporates a simple and yet highly efficient ratio changing means which, once set, does not require and adjustment over long periods of continuous use and which gives much smoother mechanism operation than has heretofore been thought possible.

In view of the above, it is an object of the present invention to provide a mechanical shift means for multi-ratio chain drives which eliminates all use of cables.

Another object of the present invention is to provide, in a multi-ratio chain drive, a mechanical linkage system for accomplishing the shifting movements.

Another object of the present invention is to provide, in a multi-ratio velocipede chain drive, a pair of mechanical linkages for shifting the derailleur means.

A further object of the present invention is to provide, in a bicycle type chain drive shift system, front and rear derailleurs having mechanical linkages for accomplishing shift movements.

An even further object of the present invention is to provide a mechanical toggle linkage for accomplishing ratio shifts in a chain drive system.

Another object of the present invention is to provide a simple mechanical shift lever for the derailleur means of a multi-ratio chain drive.

Other objects and advantages of the present invention will become apparent and obvious from a study of the following description and the accompanying drawings which are merely illustrative of such invention.

IN THE DRAWINGS

FIG. 1 is a side elevational view of a typical multiratio chain drive velocipede with the shift system of the present invention installed thereon;

FIG. 2 is an enlarged elevational view of the rear sprocket shift mechanism shown in FIG. 1;

FIG. 3 is an enlarged top plan cutaway view of the rear sprocket shift mechanism;

FIG. 4 is a sectional view taken through lines 4—4 of FIG. 1;

FIG. 5 is an enlarged elevational view of the shift handle shown in FIG. 1;

FIG. 6 is a sectional view taken through lines 6—6 of FIG. 5; and

FIG. 7 is a top plan view of the blank from which the shift lever control is formed.

With further reference to the drawings, a velocipede of the bicycle type is indicated generally at 10. Although it is understood, of course, that the shift system of the present invention can be used in conjunction with drives used for other purposes.

The velocipede 10 includes a frame composed of cross bar 11, front fork sleeve 12, lower member 13 and saddle pillar 14. Extending rearwardly from pillar 14 is rear fork 15 which intersects fork brace 16 in the normal manner. A seat or saddle 17 is provided as is handlebar 18 and its associated front fork 19 which passes through fork sleeve 12. Front and rear wheels 20 and 21 are rotatively mounted on their respective forks 19 and 15.

Rotatively mounting the front and rear wheels to their respective forks are axles 22 and 23. Operatively mounted adjacent rear wheel 21 are varying size sprockets 24 through 28 which, when chain 29 is shifted from one to the other, will vary the ratio of the drive.

At the apex or juncture of lower member 13 and saddle pillar 14 is rotatively mounted pedal crank 30 and its associated pedals 31. A pair of sprockets 32 and 33 are operatively connected to crank 30 in the normal manner.

Derailleur mechanisms 34 and 35 for the rear wheel sprockets and the pedal crank sprockets are provided.

All of the above described parts and their relationship to each other are almost universally standard throughout the bicycle industry and are well known to those skilled in the art as to both structure and mechanism. Further description of these parts except as associated with the present invention is not deemed necessary.

The chain drive shift system of the present invention includes an L-shaped bracket 36 fixedly mounted on rear axle 23 by axle nut 37 as can be seen particularly clear in FIG. 3. A U-shaped derailleur adapter 38 is fixedly attached to rear derailleur 34 by means such as screws 39. This is the only modification to the rear derailleur beside the normal cables and biasing springs being removed. The pivoting motion laterally of the derailleur as shown in solid and dotted lines in FIG. 3 is the normal motion of the standard derailleur and further description of the same is not deemed necessary.

Intermediate the ends of saddle pillar 14 is mounted a generally flat bracket 40 held in place by U-bolt 41 around said pillar. This intermediate support bracket has two openings therein though which the shift rods are adapted to pass as will hereinafter be described in greater detail. Because of the U-bolt configuration of the intermediate support bracket, adjustment longitudinally up and down along saddle pillar 14 is readily accomplished and yet tightening of the rear bolt will give a strong fixed member.

A preferred embodiment of the shift lever control means 42 is shown in detail in FIGS. 5 and 6. This shift lever control includes a generally flat portion 43, a pair of curved portions 44 and 45 with appropriate notches 46 along one edge thereof. An inwardly projecting flange 47 and 48 is provided on the end of each of the curved portions 44 and 45, respectively. An opening is provided in the end of each of the flanges 47 and 48, said opening being at the radius center of the partial circle defined by each of said curved portions. U-bolt 49 is provided for mounting flat portion 43 on cross bar 11. Once the proper location of the U-bolt 49 and its associated flat portion 43, is determined, nuts 50 can be tightened to secure the shift lever control means 42 in its proper location.

To front derailleur 35 is added one or more shift loops 51. These can be of any desired construction such as wires passing through openings drilled in the derailleur to accommodate the same. The derailleur itself operates in the standard manner with the deletion, of course, of the normal cables and their associated hardware.

The rear derailleur shift means 52 includes an elongated portion 53 adapted to pass through intermediate support bracket 40, bracket 36, and terminate adjacent the derailleur end in a crank configuration 54. This crank is in operative contact with derailleur adapter 38 as seen clearly in FIGS. 1 through 3.

The end of elongated portion 53 opposite crank configurations 54 has formed thereinto a handle 55 and terminated in a threaded portion 56. The portion of rear derailleur shift means 52 adjacent the threaded portion 56 is adapted to pass through the central opening in flange 47. A biasing spring 57 is placed between flange 47 and nut 48. This biasing spring maintains pressure on the notch engaging portion 59 of handle 55. The relationship and function of these parts is particularly obvious when viewing FIG. 5.

The front derailleur shift means 60 includes an elongated portion 61 which terminates at one end in a J-shaped crank configuration 62. The end of elongated portion 61 opposite crank configuration 62 includes a handle 63 formed therein and a threaded portion 64 with its associated nut 65. Handle 63 includes a notch engaging portion 66 and a biasing spring. Although this spring is not shown specifically in the drawings, it functions in the same manner as spring 57 hereinabove described.

Once the various parts of the chain drive shift system of the present invention have been installed and adjusted, the bicycle or other mechanical contrivance is ready for operation. The shifting sequence of the front and rear sets of sprockets is the same as any similar cable controlled shift system. For example, if the highest ratio is desired for the rear sprocket, handle 55 is moved to the position shown in FIG. 1. This will move rear derailleur adapter, through coordination with crank portion 54, to the outward position shown in FIG. 3. This will cause derailleur 34 to move inwardly carrying chain 29 to the innermost or largest sprocket 28. If the next lower drive ratio is desired, the bicycle is pedaled using pedals 31 to turn pedal crank 30 and handle 55 shifted to the left or inwardly. This will move rear derailleur adapter 38 inwardly slightly which in turn moves derailleur 34 outwardly. This will cause chain 29 to shift from sprocket 28 to smaller sprocket 27 thus giving a lower ratio drive. This shifting process can be repeated with any of the five rear sprockets being selected by simply moving handle 55.

As mentioned above, biasing spring 57 maintains notch engaging portion 57 of handle 55 in releasable retension with whichever notch 46 such engaging portion in juxtaposed to.

The same method of shifting is used for the front or crank sprockets as the rear sprockets except that there are usually only two sprockets at this location. As can be seen from FIG. 4, the crank configuration 62 of shift means 60 crosses over from the left to the right side behind saddle pillar 14 before operatively engaging shift loops 51. These loops, as hereinabove described, are secured to derailleur 35 which functions in the normal manner when biased by shift means 60.

From the above, it is obvious that the present invention has the advantage of providing a relatively simple yet highly efficient chain drive shift system which can either be incorporated into new bicycles, added to existing ones as substitute for cable controls, or can be used by other propulsion systems using this type of drive.

The terms "upper", "lower", "left", "right", and so forth have been used herein merely for convenience to describe the chain drive shift system and its parts as oriented in the drawings. It is to be understood, however, that these terms are in no way limiting since the invention may obviously be disposed in many different positions when in actual use.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced herein.

What is claimed is:

1. An improved shift means for standard bicycle sprocket derailleur means comprising: a plurality of varying sized sprocket means; a flexible chain drive means; standard derailleur means for shiftingly training said chain drive means from one sprocket to another; a generally J-shaped derailleur adapter means fixedly secured to said standard derailleur means; crank means pivotably mounted adjacent said derailleur means, one end of said crank means being in cooperative operative engagement with said J-shaped adapter means; and handle means operatively associated with said crank means on the end thereof opposite the engagement with said J-shaped adapter means whereby said derailleur can be moved to shift said chain drive means from one sprocket to another by manipulation of said handle.

2. The system of claim 1 wherein retaining means are provided for holding said handle in any one of a plurality of predetermined positions.

3. The system of claim 2 wherein said retaining means is a spring biased notch engaging means movable against a notched member.

4. The system of claim 3 wherein said notched member substantially defines a circle the center of which pivotably mounts said crank means.

5. The system of claim 4 wherein at least two sets of varying sized sprockets in the same drive system are shiftingly controlled from adjacent handle locations.

* * * * *